W. O. NOLTE.
PLOW.
APPLICATION FILED MAR. 6, 1914. RENEWED JAN. 12, 1916.

1,177,649.

Patented Apr. 4, 1916.
3 SHEETS—SHEET 1.

WITNESSES
Emil Hallenberg.
Paul A. Viesen.

INVENTOR
William O. Nolte
By H. Oanders
Atty.

W. O. NOLTE.
PLOW.
APPLICATION FILED MAR. 6, 1914. RENEWED JAN. 12, 1916.

1,177,649.

Patented Apr. 4, 1916.
3 SHEETS—SHEET 2.

WITNESSES
Emil Hallenburg
Paul A. Viersen

INVENTOR
William O. Nolte
By H. Sanders
Atty.

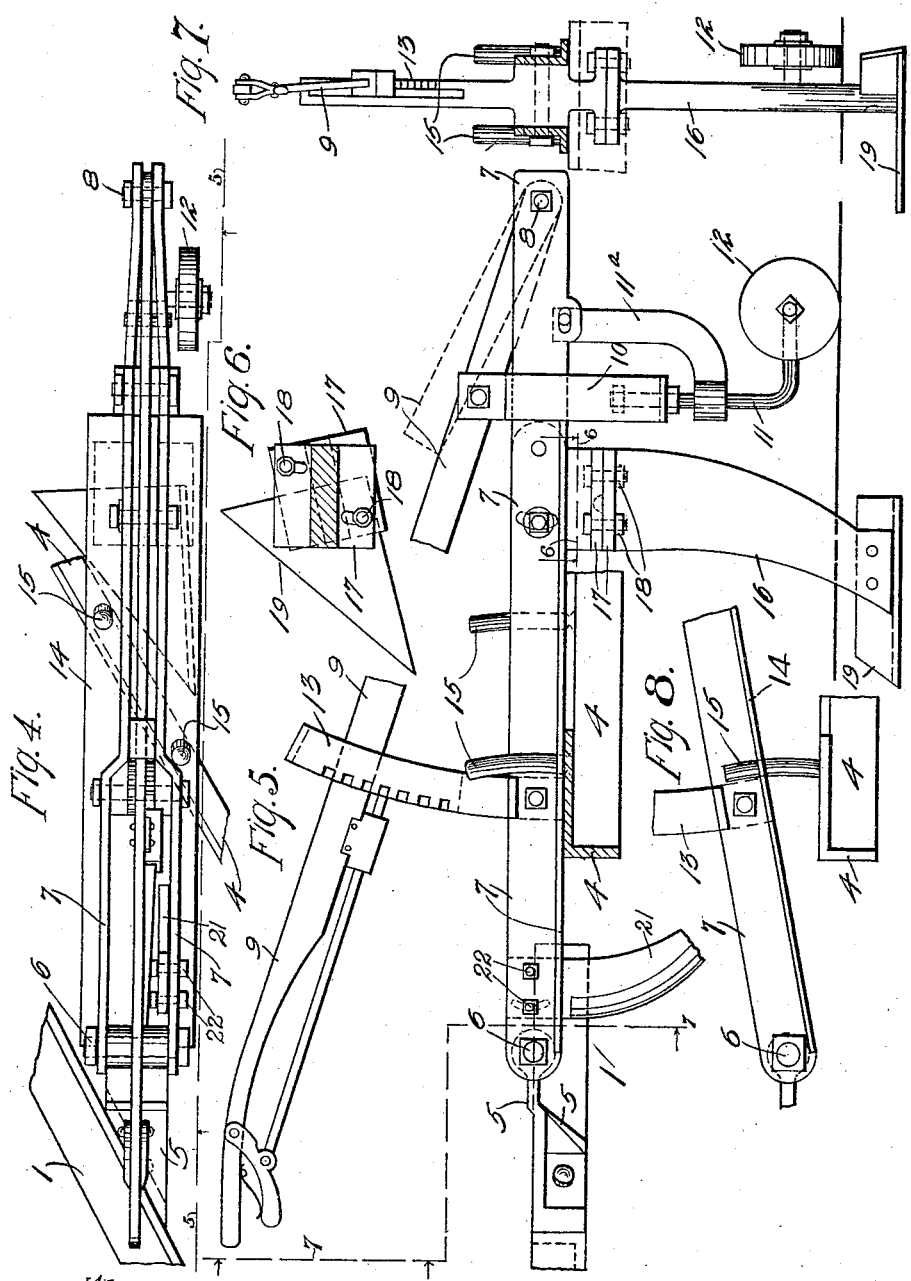

UNITED STATES PATENT OFFICE.

WILLIAM O. NOLTE, OF CAMPBELL, NEBRASKA.

PLOW.

1,177,649. Specification of Letters Patent. Patented Apr. 4, 1916.

Application filed March 6, 1914, Serial No. 822,851. Renewed January 12, 1916. Serial No. 71,803.

*To all whom it may concern:*

Be it known that I, WILLIAM O. NOLTE, a citizen of the United States, residing at Campbell, in the county of Franklin and State of Nebraska, have invented certain new and useful Improvements in Plows, of which the following is a specification.

This invention relates to improvements in plows and more particularly in a plow designed primarily for severing the small underground roots of the palmetto plant, indigenous to the West Indies and to the Southern United States, from the large palmetto roots which lie upon the ground.

The invention also has for its object a sectional plow of this nature which may comprise one or more sections suitably bolted together to form a gang plow.

Each plow or plow section comprises a right-angled triangular main frame, in which is bolted a frame extension, to the hypotenuse of which a plurality of plow beams are bolted each of which in sequence projects beyond the other. Each of said plow beams is formed with a base plate which is apertured to receive guide pins carried by the frame extension whereby independent lateral movement of the beams is obviated and each plow beam is provided with a vertically depending adjustable plow blade which carries terminally an approximately horizontal triangular adjustable plow blade adapted to work underground. Means for adjusting the plow beams vertically are also provided.

With the foregoing and other objects in view the invention consists in the combination and arrangement of parts to be hereinafter fully described in the following specification, pointed out in the claim and illustrated in the accompanying drawings which form a part of said specification and in which—

Figure 1:
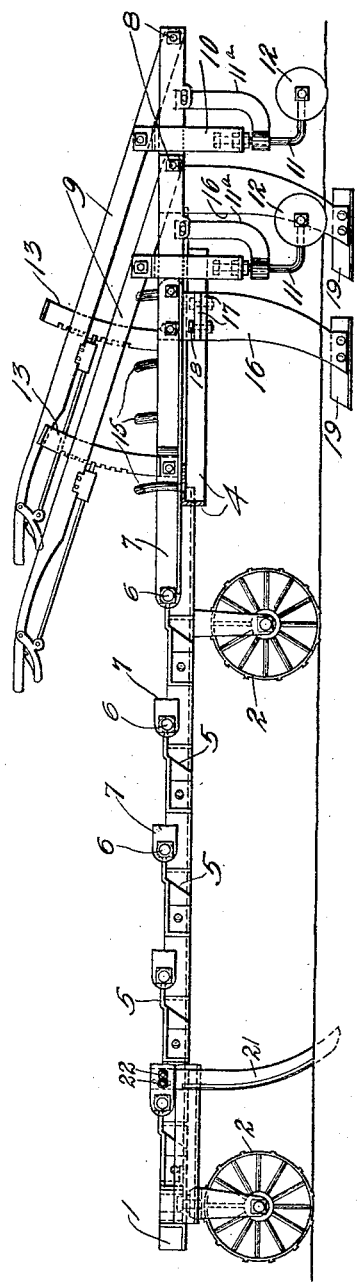
Figure 2:
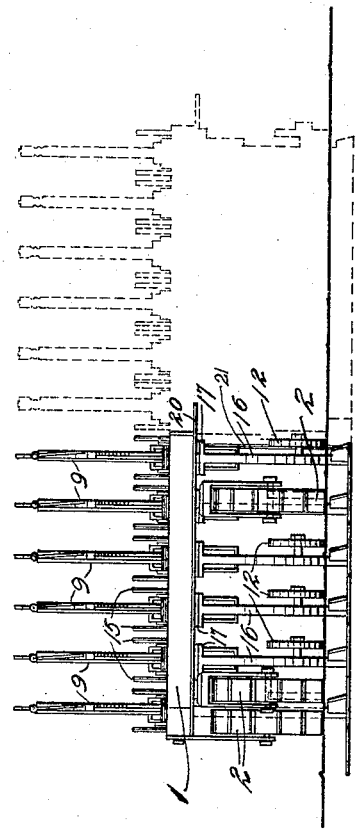
Figure 3:
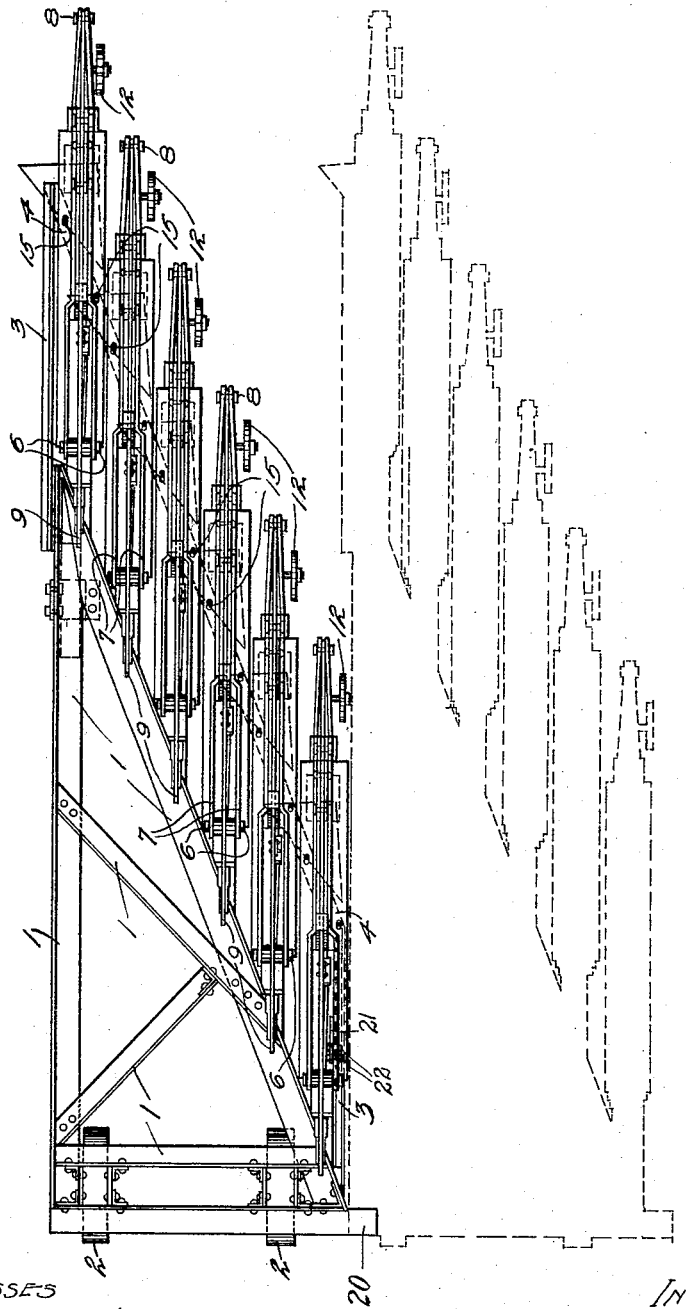

Figure 1 is a side elevation of my improved plow with several of the plow beams broken away to better show the frame construction. Fig. 2 is an end elevation, the dotted lines showing another complete plow section which may be bolted to the section or plow shown in full lines. Fig. 3 is a plan view of Fig. 2. Fig. 4 is a plan of one plow beam showing its attachment to the frame. Fig. 5 is a side elevation taken on line 5—5 of Fig. 4. Fig. 6 is a cross section taken on line 6—6 of Fig. 5. Fig. 7 is an end view of Fig. 5 taken on line 7—7 of that figure. Fig. 8 is a side view of a portion of Fig. 5 showing the plow beam in an altered position.

Like reference characters indicate corresponding parts throughout the several views.

My improved plow which consists of one or more complete sections comprises a right-angled triangular main frame 1 provided with wheels 2 and with projecting parallel supports 3, 3 which are connected by a beam 4 running parallel with the hypotenuse of the main frame. To the hypotenuse of the main frame a plurality of angular supports 5 are secured which pivotally carry at 6 the plow beams which lie parallel to each other but which, taken in sequence, project beyond one another. Each plow beam comprises the sides 7, 7 which at one end are disposed upon the pivot 6 and at the opposite or free end are connected together by a bolt 8 which bolt also pivotally carries a lever 9 to which a depending casting 10 is secured that carries the angular axle 11, passing through guide 11$^a$, of the disk 12. Each lever 9, moreover, is adapted for engagement with a curved rack 13 bolted to the sides 7, 7 of the beam by which means a beam may be adjusted vertically. Each plow beam also comprises a base plate 14 which is apertured to receive the pins 15, 15 carried by the beam 4 of the frame extension and by means of said pins independent lateral movement of the plow beams is obviated.

To each plow beam a sectional vertical plow blade 16 is adjustably bolted, the connected portions of the sectional blade terminating in slotted adjustable plates 17, 17 bolted together at 18 to permit limited rotary adjustment of one section independently of the other section.

Each plow blade 16 is formed with one vertical cutting edge. To the lower end of blade 16 a triangular blade 19 is bolted and the same may be adjusted or given a pitch by adjusting the blade 16 with relation to the plow beam. In use the motive power is attached to the base of the main frame and a large palmetto root lying upon the surface of the ground is first encountered by the vertical blade 16 secured nearest to the base of the main frame. This blade may cut the root in two or it may swing it about or push it partly out of the way when other blades 16 may encounter it and cut it or it may pass between the blades without being cut; in the meantime the triangular blades 19 encounter the small roots under the soil and sever the same from the large root, thus effectually ridding the land of the palmetto plant with the greatest facility and at least expense. Each plow section is provided with an angular plate 20 to which another section may be bolted to form a gang plow. To the plow beam 7 nearest the base of the main frame a knife 21 may be secured by bolts 22 if desired which knife extends to the ground line to cut the large roots in advance of the plow blades.

What is claimed is:—

In a plow, a right-angled triangular main frame, a frame extension connected thereto, a plurality of parallel plow beams pivotally associated with the hypotenuse of said triangular main frame, guide pins connecting said frame extension and plow beams whereby independent lateral movement of the latter is obviated, vertical plow blades adjustably carried by said plow beams and angular plow blades terminally carried by said vertical plow blades.

In testimony that I claim the foregoing as my own I have hereto affixed my signature in the presence of two subscribing witnesses.

WILLIAM O. NOLTE.

Witnesses:
N. W. BOGNON,
JAKE REIBER.

Copies of this patent may be obtained for five cents each, by addressing the "Commissioner of Patents, Washington, D. C."